United States Patent [19]
Shinozaki

[11] 3,860,955
[45] Jan. 14, 1975

[54] COLOR IMAGE PICKUP DEVICE

[75] Inventor: Takashi Shinozaki, Yokohama, Japan

[73] Assignee: Victor Company of Japan, Ltd., Yokohama City, Kanagawa-ken, Japan

[22] Filed: Apr. 25, 1973

[21] Appl. No.: 354,327

[30] Foreign Application Priority Data

Apr. 28, 1972 Japan .............................. 47-42941

[52] U.S. Cl. .............................................. 358/44
[51] Int. Cl. .............................................. H04n 9/06
[58] Field of Search ............ 178/5.4 ST; 358/44, 45

[56] References Cited

UNITED STATES PATENTS 3,582,984 6/1971 Kurokawa ..................... 178/5.4 ST

*Primary Examiner*—Richard Murray
*Assistant Examiner*—Mitchell Saffian

[57] ABSTRACT

A color image pickup device comprises a lenticular lens disposed in front of and between the image forming screen of a pickup tube and an object to be televised. A color-resolving stripe filter is disposed in front of the lenticular lens. The transverse width of one group of filter elements of the stripe filter is selected to be twice the pitch of each lens element of the lenticular lens. Furthermore, the positions of the lenticular lens and of the stripe filter relative to the image forming screen are selected so that the optical image of the filter is formed on the image forming screen with a magnification ratio of 1 : 1.

3 Claims, 3 Drawing Figures

COLOR IMAGE PICKUP DEVICE

BACKGROUND OF THE INVENTION

This invention relates generally to a device for picking up color television images and more particularly to such a color image pickup device having an optical system comprising a color-resolving stripe filter and a lenticular lens.

Various proposals have been made heretofore with respect to a device for picking up color television images by means of a combination of a color-resolving stripe filter and pickup tubes and for generating color signals, including the invention disclosed in copending U.S. Pat. application Ser. No. 315,157, filed Dec. 14, 1972, now U.S. Pat. No. 3,808,357 and entitled "Single Tube Color Camera."

In a color television signal generating device of this type, one requirement is that the optical image of the color-resolving stripe filter always be formed with high efficiency on the image-forming surface of the pickup tube. Then, if the color-resolving stripe filter is installed within it, the pickup tube requires a special construction, which heretofore has entailed high costs. On the other hand, if the optical image of the color-resolving stripe filter is formed on the screen of the pickup tube through relay lenses, the apparatus itself becomes expensive because of the high price of the relay lenses.

Accordingly, in order to overcome these difficulties, an apparatus has been proposed wherein the optical image of a color-resolving stripe filter installed in the optical system of the pickup tube is formed on the image screen (photoconductive screen or photoelectric screen) of the pickup tube by a multi-lenticular lens. It has been found, however, that the following problem exists in a color-television (pickup) apparatus of this type if a color-resolving stripe filter and a lenticular lens are provided in the optical system in this manner. Pickup depends on factors such as the magnification of the optical image of the filter formed on the pickup tube screen, the ratio of the transverse dimension of one filter element group in the filter, and the pitch of the cylindrical lenses in the lenticular lens system. Discontinuities of the optical image are produced on the image screen when the lens F number (i.e., the quotient of the lens focal distance divided by the lens diameter) is large, then it becomes impossible to pick up images in bright places.

This problem can be solved by an arrangement wherein a neutral-density (N.D) filter is provided in the optical system of the pickup tube thereby to carry an out adjustment of light quantity. However, since an N.D filter is expensive, this arrangement is not desirable in applications such as simple color television cameras for use in homes.

A single unit of a simplified color-television camera for home use (as mentioned above) is generally used for picking up images both indoors and outdoors. For this reason, some sort of device for light quantity adjustment is necessary in its optical system. Ordinarily an iris of simple construction is used as this light quantity adjusting device. Consequently, as mentioned above, the optical image of the color-resolving stripe filter on the pickup tube screen becomes discontinuous during the use of the camera in bright places. Therefore, color-television signals cannot be obtained in some bright places.

SUMMARY OF THE INVENTION

Accordingly, it is a general object of the present invention to provide a novel and useful color image pickup device in which the above described difficulties have been overcome.

More specifically, an object of the invention is to provide a color image pickup device in which the above described difficulties have been overcome by the selection of appropriate and specific values for the relative dimensions of the filter element group in a color-resolving stripe filter, cylindrical lens elements of a lenticular lens in the optical system of a pickup tube, and the magnification of the optical image of the color-resolving stripe filter formed on the image screen of the pickup tube.

Another object of the invention is to provide a color image pickup device capable of always generating excellent color television signals irrespective of the magnitude of the F number of the optical system and without producing discontinuities, even when an iris is used.

Further objects and features of the invention will be apparent from the following detailed description when read in conjunction with the accompanying drawings, in which like parts are designated by like reference numerals and characters.

DETAILED DESCRIPTION

Figure 1:
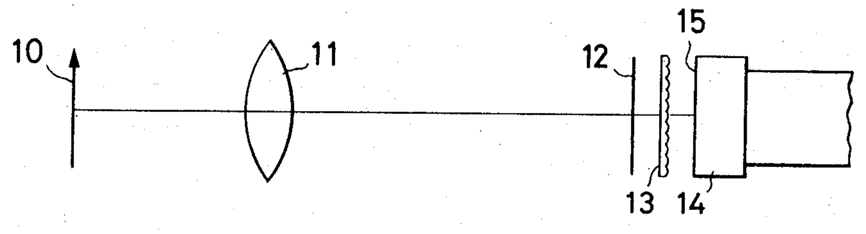
FIG. 1 is a simplified schematic diagram showing the optical system of a color image pickup system having a color resolving stripe filter and a lenticular plate in the optical system.

As indicated, FIG. 1 shows an optical system of general character of a color image pickup device. The image of an object 10, to be televised, passes through a lens 11, a color-resolving stripe filter 12, a lenticular lens 13 and is formed on the image screen of a pickup tube 14. Then, if the optical image passed through the color-resolving stripe filter 12 is formed as a sharp image on the screen of the pickup tube 14, color stripes will appear in the reproduced image. For this reason, the optical image must be defocused. For this purpose, the lenticular lens 13 is used to attain an optical defocusing effect (low-pass filtering effect). Therefore, the lenticular lens has the two functions of a low-pass optical filter and of means for causing light which has passed through the color-resolving stripe filter to form an image on the image screen.

The blur width $\Delta$ of the image defocused by the lenticular lens 13 can be expressed by the following equation.

$$\Delta = P \cdot l/F$$

where: $F$ is the focal distance of the lenticular lens 13; $l$ is the distance between the lenticular lens 13 and the image screen; and $P$ is the pitch of the lenticular lens. In a two-tube separate luminance system, an optical band of the order of 500 KHz is desirable. Furthermore, regarding the above mentioned distance $l$, selection of a small value thereof is advantageous because of limitations of the brightness and definition of the stripe image. This distance is in the order of the thickness of the glass of the vidicon.

Figure 2:
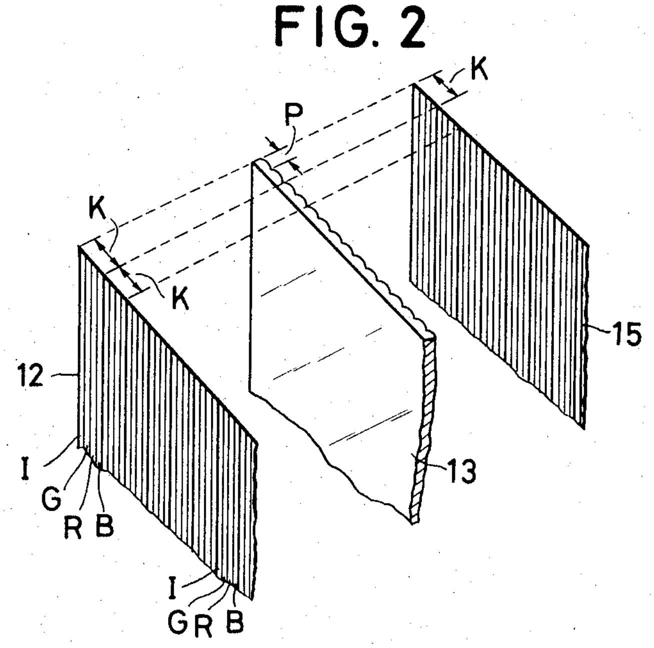
FIG. 2 is a fragmentary perspective view indicating the relationship between the color-resolving stripe filter and the lenticular plate.

In the system of the present invention, the above mentioned color-resolving stripe filter 12 comprises a large number of thin stripes extending in the vertical direction, perpendicular to the horizontal scanning direction as shown in FIG. 2. One set or group of these stripes consists of four strips, namely, an index stripe I, a green stripe G, a red stripe R, and a blue stripe B. A plurality of these groups are disposed in an orderly, repeated arrangement. The transverse width of each group of filter elements is denoted by the character K.

The lenticular lens 13 is disposed between and parallel to the color-resolving stripe filter 12 and the image screen 15 of the pickup tube 14. As indicated in FIG. 2, the spacing interval or pitch of the cylindrical lenses of the lenticular lens 13 is denoted by the character P.

In the system of the present invention, the image ratio (image magnification) of the cylindrical lenses of the lenticular lens 13 is 1 : 1. The light which has passed through the color-resolving stripe filter 12 is caused by the cylindrical lenses of the lenticular lens 13 to form an image on the image screen 15, as a sharp optical image of a size such that the transverse dimension of each filter element group is equal to K.

In the system of the present invention, the relationship between the above mentioned pitch P and the above mentioned transverse width K is $K = 2P$. It is obvious the manufacture of these parts would be greatly facilitated that if, in the actual production of the device, an error of the order of a number of percent could be allowed in dimensions such as the width K, the pitch P, and the thickness of the cylindrical lenses. In such a case, the relationships of $K = 2P$ and image magnification (image ratio) of 1 : 1 will deviate somewhat, but certain experiments have varified that, in actual practice, the resulting device has ample utility for its intended use.

Figure 3:
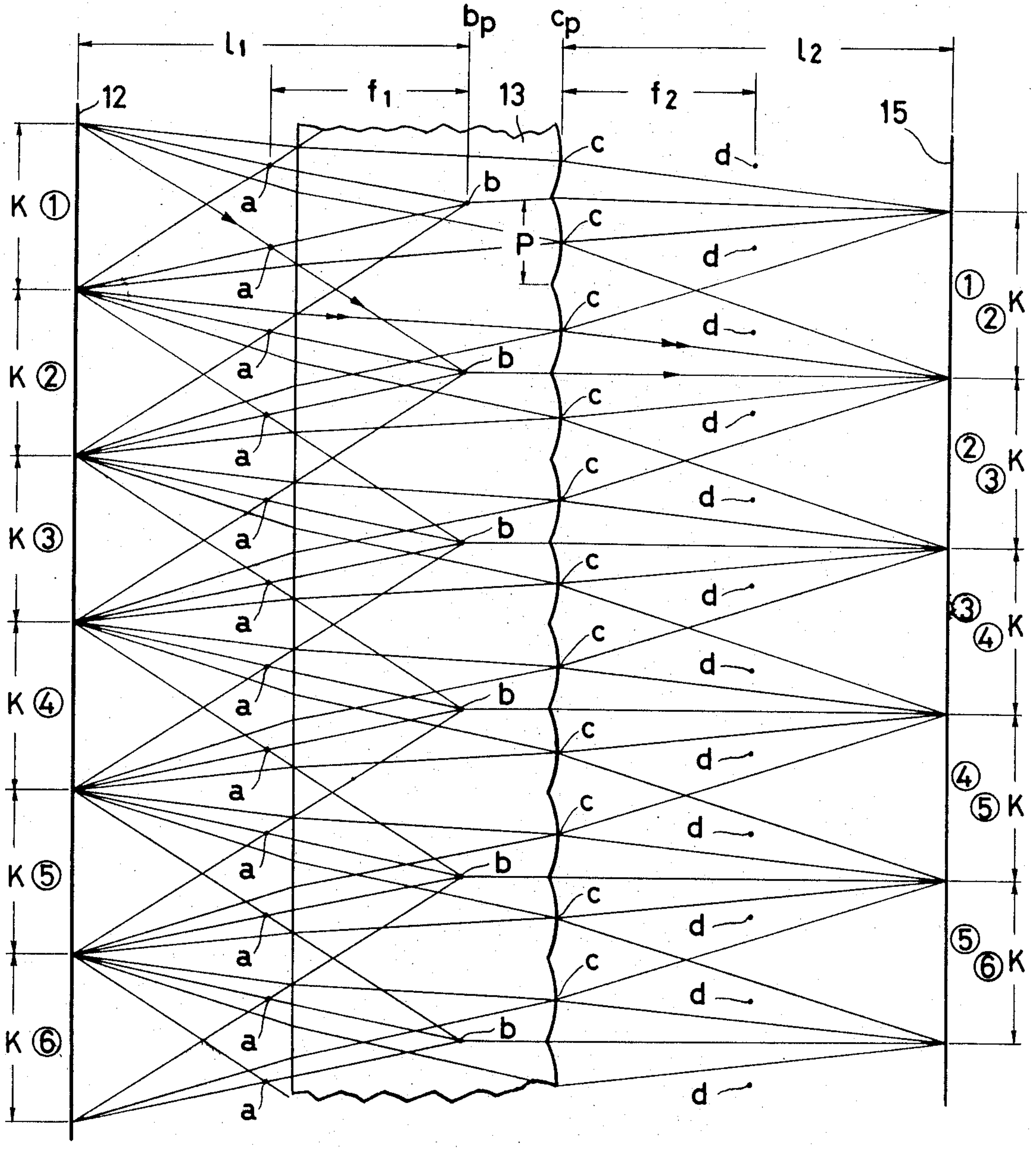
FIG. 3 is a diagram showing light paths for a description of image formation with respect to the color-resolving stripe filter and lenticular plate, in one embodiment of the device according to the invention.

An example of an optical state, wherein groups of filter elements of the color-resolving stripe filter 12 are formed as an optical image of a magnification of 1 on the image screen 15, is illustrated in FIG. 3.

In the case where an optical image of the color-resolving stripe filter 12 is formed as an optical image of an image ratio (image magnification) of 1 on the image screen by the cylindrical lenses of the lenticular lens 13, the following relationships exist. The distance $l_1$ is measured between the color-resolving stripe filter 12 and the plane (hereinafter referred to as the first principal plane) bp including the first principal points *b*, *b*, . . . of the lenticular lens 13. Distance $l_1$ is equal to the distance $l_2$ between the plane (hereinafter called the second principal plane) *cp* including the optical centers *c*, *c*, . . . of the lenticular lens 13 and the image screen 15. Furthermore, the distance (focal distance) $f_1$ between the first focal points *a*, *a*, . . . of the cylindrical lenses of the lenticular lens 13 and the first principal plane bp and the above mentioned distance $l_1$ have the relationship $l_1 = 2f_1$. In addition, the distance (focal distance) $f_2$ between the second focal points *d*, *d*, . . . of the cylindrical lenses of the lenticular lens 13 and the second principal plane *cp* is related to the above mentioned distance $l_2$ by the equation $l_2 = 2f_2$.

The forming of the image in the optical system indicated in FIG. 3 is accomplished in the following manner. The light rays which have passed through the first focal points *a*, *a*, . . . intersect the first principal plane *bp* and thence advance parallel to the optical axis. Light rays which enter the lenses as incident rays and light rays resulting from the passage of these incident rays through the lenses are projected out from the lenses in mutually parallel paths. All of these light rays pass through the optical centers *c*, *c*, . . . FIG. 3 diagrammatically indicates, on an enlarged scale, the state of image formation in the case where the F number of the lens is 2, $l_2$ is 1.50234 mm., $f_1 = 0.75117$ mm., and $K$ is 0.156 mm.

The numbers①,②, . . . disposed to the left of the color-resolving stripe filter 12 in FIG. 3 denote the numbers of the aforementioned groups of filter elements. The numbers①,②, . . . disposed to the right of the image screen 15 denote filter images formed in correspondence to the above mentioned filter element groups. Two numbers are here placed together to indicate overlapping of images. Since these overlapping images are of the same phase, there is no inconvenience or adverse effect due to this overlapping of images, and, moreover, image continuity is preserved.

In the system of the present invention, the image is formed by all inclined light rays other than parallel light rays. Accordingly, there is no impairment whatsoever of the continuity of the image even without the use of an iris.

In the case where the F number of the optical system is less than the value determined by the relationship $$F \text{ number} = l_1/K + \tfrac{1}{2}K = \tfrac{2}{3} \cdot l_1/K,$$

overlapping of optical images, with accurate phase relationships, is obtained on the image screen 15, the rate of utilization of light quantity becomes excellent. When these quantities $l_1$ and $K$ have the values of the above described quantitative example, the F number becomes approximately 6.4.

In the above described embodiment, there is an empty space between the stripe filter 12 and the lenticular lens 13. The thickness of the lenticular lens 13 may be selected to be greater than that indicated in FIG. 3 and to be of a value such that the distance between the surface of the lens 13 opposite the lens surface (planar surface on the left-hand side as viewed in FIG. 3) and the first principal plane *bp* becomes equal to the distance $l_1$. With this dimensional relationship, the assembly of these parts is greatly facilitated since the distance $l_1$ can be easily and accurately established merely by causing the left-hand flat surface of the lenticular lens 13 to adhere intimately against the color-resolving stripe filter 12. For a lenticular lens 13 of a thickness as indicating in FIG. 3, a glass plate of a thickness to fill the space between the lens and the filter 12 may be interposed therebetween.

Further, this invention is not limited to these embodiments but various variations and modifications may be made without departing from the scope and spirit of the invention.

What I claim is:

1. A color image pickup device comprising:

a pickup tube having an image-forming surface at its front face;

a multi-lenticular lens disposed at a specific distance in front of the image-forming surface and comprising a plurality of cylindrical lens elements arranged transversely in side-by-side positions with a predetermined pitch P, the cylindrical lens elements facing the image-forming surface;

a color-resolving stripe filter disposed at a specific distance in front of the lenticular lens and comprising a plurality of groups of filter elements, each group comprising a plurality of filter elements respectively passing light of different wavelengths and disposed successively in a predetermined sequence, which is repeated in all other groups, each group having a predetermined transverse width K which is two times the predetermined pitch P; and an objective lens disposed in front of the color-resolving stripe filter and between said filter and an object to be picked up;

the lenticular lens and the color-resolving stripe filter being so arranged and adapted that a first distance between a principal plane at which light rays passing through the focal points of the lenticular lens change their paths of advance to become parallel to the optical axis within the lenticular lens and the surface of the color-resolving stripe filter facing the lenticular lens is equal to a second distance between a plane passing through the optical centers of all lens elements of the lenticular lens and the image-forming surface.

2. A color image pickup device as claimed in claim 1 in which the lenticular lens has a thickness such that the surface thereof opposite said lens surface is in intimate contact with the color-resolving stripe filter.

3. A color image pickup device as claimed in claim 1 in which said first distance is two times the distance between a first focal point of the lenticular lens and said principal plane, and said second distance is two times the distance between a second focal point of the lenticular lens and said plane passing through said optical centers.

* * * * *